United States Patent [19]
Quinn et al.

[11] Patent Number: 5,547,288
[45] Date of Patent: Aug. 20, 1996

[54] CAMSHAFT BUSHING ASSEMBLY

[75] Inventors: Paul R. Quinn, Lyndhurst; Richard R. Kempski, Chagrin Falls; Douglas J. King, Elyria, all of Ohio

[73] Assignee: Euclid Industries, Inc., Cleveland, Ohio

[21] Appl. No.: 394,408

[22] Filed: Feb. 24, 1995

[51] Int. Cl.⁶ ............................ F16C 23/04; F16C 33/74
[52] U.S. Cl. ........................ 384/207; 384/152; 384/397
[58] Field of Search ............................... 384/130, 152, 384/192, 206, 207, 213, 299, 286, 322, 397

[56] References Cited

U.S. PATENT DOCUMENTS

| | | | |
|---|---|---|---|
| 2,591,221 | 4/1952 | Whiteley | 384/207 |
| 2,886,379 | 5/1959 | Small | 384/207 |
| 2,923,579 | 2/1960 | Scheel | 384/397 X |
| 3,497,275 | 2/1970 | Hanley et al. | 384/152 |
| 3,552,808 | 1/1971 | Mathers et al. | 384/207 |
| 3,589,781 | 6/1971 | Hanley | 384/152 |
| 3,819,242 | 5/1974 | Robinson | 384/152 |
| 4,036,345 | 7/1977 | Webb | 384/299 X |
| 4,317,600 | 3/1982 | Li | 384/491 |

FOREIGN PATENT DOCUMENTS 2238834  6/1991  United Kingdom.

*Primary Examiner*—Thomas R. Hannon
*Attorney, Agent, or Firm*—Hopkins & Thomas

[57] ABSTRACT

An external metal housing (10) is formed of two abutting metal plates (11, 12), each having a perimeter support wall (13) and an outwardly extending annular protruding wall (14) defining a bushing receiving area. An internal annular bushing (22) is accommodated within the receiving area and has two annular grooves (28) receiving two O-rings (30). A zerk fitting (38) extends through a closed-edge opening (16) of the external metal housing (10) and threads through the internal bushing (22) to deliver lubricant directly to the internal cylindrical surface of the internal annular bushing and to the facing surface of a camshaft extending through said internal bushing. The bushing is made of molybdenum impregnated nylon.

6 Claims, 2 Drawing Sheets

CAMSHAFT BUSHING ASSEMBLY

FIELD OF THE INVENTION

The invention relates to a camshaft bushing assembly for the brakes of an automotive vehicle. The bushing assembly has a housing for mounting to the vehicle and an annular bushing supported in the housing that rotatably receives the camshaft of the brakes of the vehicle. The invention relates also to an improved method of assembling a camshaft bushing assembly.

BACKGROUND OF THE INVENTION

Camshaft bushings are provided for supporting and allowing proper rotation of the camshaft in mechanical brakes for automotive vehicles. Typically, a supporting housing for the bushing assembly is formed from two similar metal plates, each having a generally flat support wall and an outwardly extending protrusion and a converging flange defining an opening through which a camshaft is to extend. The plates are assembled back to back and the oppositely facing protrusions are aligned and their flanges are aligned to form the camshaft opening. An annular bushing having a cylindrical inner surface is positioned in the housing with its cylindrical inner surface aligned with the opening of the housing for receiving the cam shaft. The camshaft bushing assembly is mounted in place on the vehicle by bolting the support walls to the vehicle.

Typically, the housing is manufactured of steel for sturdy, durable use for the lifetime of the vehicle and the internal bushing is made of nylon, plastic or fiberglass filled nylon which is capable of allowing the camshaft which extends through the bushing to oscillate during its braking functions without rapid wear. Nylon and plastic bushings tend to absorb moisture which might cause dimensional changes in the bushing, and these materials have a relatively high coefficient of thermal expansion, which tends to cause structural size changes in the bushing. Such structural changes in the bushing can cause lock-up of the camshaft in the bushing. Fiberglass has been added to nylon bushings to increase the thermal stability of the bushing. However, fiberglass is a more abrasive material, and when it is incorporated in a bushing, it tends to wear out its camshaft, especially if the bushing is not properly lubricated.

Other materials for manufacture of bushings have been taught by the prior art. For example, U.S. Pat. No. 3,589,781 to Hanley et al. teaches a bearing assembly having a bushing made of nylon containing about 30% distributed glass fibers and about 5% molybdenum disulfide. Hanley et al. discloses a bushing that is substantially free of dimensional changes. U.S. Pat. No. 4,036,345 to Webb teaches that a housing for a ball bearing may be made self-lubricating with the addition of graphite or molybdenum disulfide to nylon.

Typically, lubricant, or grease, is provided to the internal surface of the bushing and the facing exterior surface of the camshaft. Lubricant may be provided through a grease fitting port in the housing which communicates with the space between the interior of the housing and the exterior of the bushing, and through holes in the bushing to the facing surface of the camshaft. One prior art bushing has a zerk fitting which threads into a port in the housing. The lubricant applied through the zerk fitting must fill the space between the housing and the bushing before it passes through holes in the bushing to reach the interior surface of the bushing and the facing exterior surface of the camshaft, thus wasting lubricant and not assuring proper delivery of the lubricant to the camshaft. U.S. Pat. No. 3,557,808 to Mathers et al. teaches a brake camshaft bearing wherein a zerk fitting threads directly into a truncated bearing ball and delivers lubricant directly to the interior surface of the bearing ball. U.S. Pat. No. 3,819,242 to Robinson also teaches a zerk fitting threaded directly through a bushing.

To better distribute the grease around the inside surface of the bushing and to provide for temporary storage of grease, some bushings have provided longitudinal grooves cut into the inner surface of the bushing. Excess grease may collect in these grooves when the grease is applied through the zerk fitting, and as the camshaft rotates within the bushing the grease will be distributed around the interior surface of the bushing. Typically, O-rings are positioned at opposite ends of the cylindrical bearing surface of the bushing for sealing the area between the O-rings, the cylindrical inner surface of the bushing, and the facing surface of the camshaft against the escape of the lubricant. These O-rings usually are seated in grooves formed between the ends of the bushing and the face or lip of the housing of the bushing. For example, see U.S. Pat. No. 3,589,781 to Hanley et al. and U.K. Patent Application 2,238,834 where the O-rings are located between the lips of the housing and the opposite edges of the bushing.

The manufacturing procedure for producing the camshaft bushing assembly is important. It is preferable that the annular bushing be substantially rotationally immobilized within the housing of the bushing assembly. Movement of the bushing tends to cause excess wear on the bushing and, in a bushing assembly in which the zerk fitting is supported by the annular bushing and not by the housing, as taught by Mathers et al. and Robinson, the zerk fitting may be broken away from the annular bushing by engagement with the metal housing. The manufacturing process should align the longitudinal axis of the bushing with the longitudinal axis of the opening of the housing and should substantially rotationally immobilize the bushing within the housing.

Assembling a camshaft bushing assembly wherein the spherical bushing is supported between two metal plates has been taught previously, as by Mathers et al. by providing an edge of one of the protruding areas of the housing with a recess which permits the spherical bushing to be oriented out of alignment with the opening through the housing, inserted through the recess and into the opening and then the bushing is rotated into alignment with the opening of the housing. The zerk fitting slides into an open edge groove cut in the housing. Having to form a groove and a deflected portion as in Mathers et al., however, tends to render the assembly structurally weak and is undesirable.

SUMMARY OF THE INVENTION

Briefly described, the present invention comprises an improved camshaft bushing assembly for the brakes of automotive vehicles, such as the drum brakes of heavy duty trucks. The camshaft bushing includes a housing for rigidly mounting to the automotive vehicle and an internal annular bushing retained in the housing. The housing is formed from two steel plates, each plate having a substantially flat perimeter support wall and a centrally positioned annular protruding wall. The plates are positioned in back-to-back relationship with the annular protruding walls extending in opposite directions. Camshaft openings are formed in the protruding walls, with the openings being coaxial, so as to receive the camshaft through the housing. The protruding walls converge inwardly as they extend outwardly from the perimeter walls, and thus form a receptacle for an annular bushing within the housing.

The annular bushing which is accommodated within the housing is made of molybdenum impregnated nylon which has self-lubricating properties. The bushing is formed in the shape of a truncated sphere, with a cylindrical inner wall which is axially aligned with the openings of the housing. A grease port is formed through the inner annular bushing, and grooves are formed in the inner cylindrical wall of the annular bushing. A grease or "zerk" fitting is threaded or otherwise fastened in the grease port. A closed edge opening is formed in one of the converging annular protruding walls of the housing, and the zerk fitting protrudes from the inner annular bushing, outwardly through the closed edge opening. With this arrangement, grease can pass from a pressurized supply through the zerk fitting directly through the grease port, and to the interior cylindrical wall of the annular bushing, to make direct contact with the facing surface of the camshaft received through the bushing assembly.

The closed edge opening in the annular protruding wall is generally circular and is of appropriate diameter that the zerk fitting does not contact the protruding wall of the housing which defines the closed edge opening. If a camshaft received through the bushing assembly is tilted axially, the camshaft position will cause the bushing to tilt within the housing. The camshaft may be tilted to the extent that it contacts the outer lips of the housing protruding walls. At this point, the bushing will be prevented from rotating any further within the housing. The closed edge opening is large enough that the zerk fitting will not contact the housing forming the closed edge opening even when the camshaft is tilted to its furthest extent possible. This prevents the zerk fitting from hitting the housing and prevents resultant damage to the zerk fitting.

The cylindrical surface of the annular bushing defines O-ring grooves at opposite ends of the cylindrical wall, and O-ring seals are placed in the O-ring grooves, for contacting the camshaft. The O-rings and their grooves form a seal between the facing surfaces of the camshaft and the inner annular bushing.

An important aspect of the present invention is the process by which the camshaft bushing assembly is assembled. The simple design of the housing permits one plate of the housing to be placed on a staking tool, the zerk fitting threaded into the grease port of the inner annular bushing, the bushing placed in the plate on the staking tool, and then the opposite plate placed over the annular inner bushing. Arbors are moved in from opposite directions of the bushing assembly so as to project into and align opposite ends of the cylindrical wall of the inner annular bushing. In the meantime, the outer converging annular surfaces of the protruding walls of the plates are swaged inwardly so that the interior surfaces of the protruding wails engage and frictionally hold the outer spherical surface of the annular bushing in a substantially rotational stationary relationship with respect to the housing. The bushing is, however, preferably axially tiltable within the housing so as to adjust to the position of the camshaft within the bushing. That is, the bushing is tillable so that the bushing axis may line up with the camshaft axis. Further, the flat perimeter walls of the housing plates are punched, so as to rigidly connect the housing halves together about the inner annular bushing.

Thus, it is an object of the present invention to provide an improved bushing assembly for the brake camshaft of an automotive vehicle which can pass grease or other lubricant directly to the interior cylindrical surface of the inner annular bushing and the facing exterior surface of the camshaft received through the bushing, without having to fill up the area between the bushing and its exterior housing with the lubricant.

Another object of the present invention is to provide an improved camshaft bushing assembly which has O-rings received in O-ring grooves formed in the cylindrical inner wall of the annular bushing, and a grease port formed in the inner annular bushing with a fitting which communicates directly through a closed edge hole in the housing to the grease port.

Another object of this invention is to provide an improved bushing assembly which includes a closed edge opening in the outer housing for receiving a grease fitting that extends from outside the housing, through the opening, and directly to the inner annular bushing for supplying grease directly to the camshaft.

A further object of the present invention is to provide an improved method for assembling a camshaft bushing assembly which incorporates the above structural features and which has improved structural integrity and wherein the inner annular bushing is rotationally immobilized within the outer housing.

Other objects, features and advantages of the present invention will become apparent upon reading the following specification, when taken in conjunction with the accompanying drawings.

DETAILED DESCRIPTION

Figure 1:
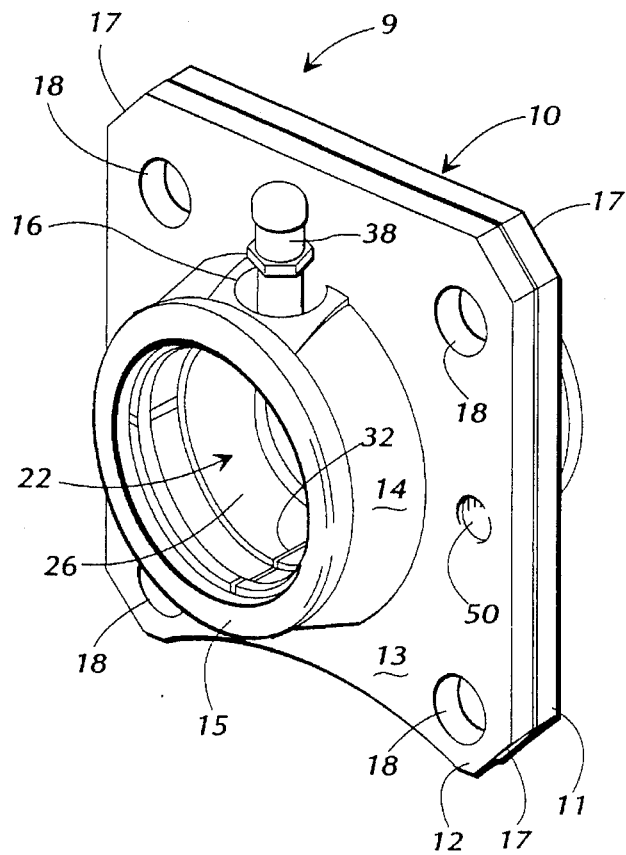
FIG. 1 is a perspective view of the camshaft bushing and housing assembly of the present invention.
Figure 2:
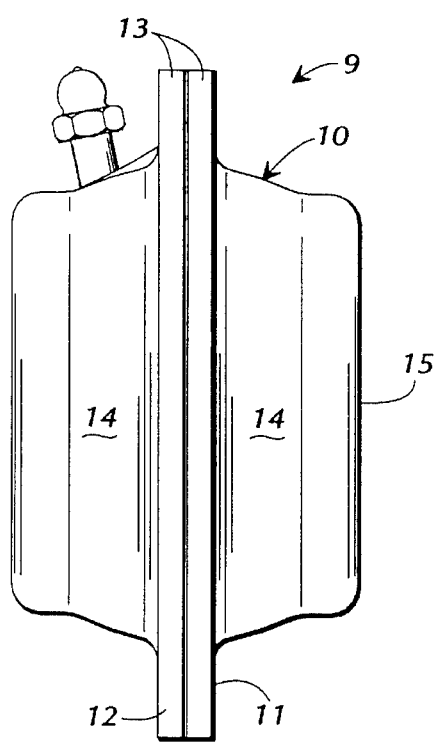
FIG. 2 is a side view of the camshaft bushing and housing assembly.

Referring now in more detail to the drawings, in which like numerals refer to like parts throughout the several views, FIG. 1 illustrates a perspective view of a preferred embodiment of the present invention, showing the camshaft bushing assembly 9 which includes an external metal housing 10 and an internal annular bushing 22 mounted in the housing. As shown more clearly in FIG. 2, the housing is constructed of two metal plates 11 and 12, each of which includes a generally square perimeter support wall 13 with bevelled corners 17, and a centrally located annular protruding wall 14 extending from the perimeter support wall 13 and ending in a circular inwardly extending flange or lip 15. The protruding wall 14 of each metal plate converges inwardly toward its lip 15. The lips 15 of the protruding walls are circular and coaxially aligned and form an opening through the housing for receiving the camshaft of a brake assembly of an automotive vehicle, such as a track having dram brakes. A closed-edge grease opening 16 (FIG. 1) is defined in the protruding wall of one of the metal plates 12 at the junction of the protruding wall 14 with the support wall 13.

Each metal plate 11 and 12 of the metal housing 10 has four bolt holes 18, one hole at each comer of its perimeter support wall 13. When the two metal plates are placed with their perimeter support walls 13 in abutment and their bolt holes 18 aligned, a receptacle is formed by the converging protruding walls for receiving the internal annular bushing 22. Internal bushing 22 is fabricated of a molybdenum impregnated nylon, such as a formulation which is made under the tradename NYLATRON GS by the Polymer Corporation, Reading, Pa. The chemical name of this formulation is 98% polyhexamethylene adipamide plus 2% molybdenum disulfide.

Figure 3:
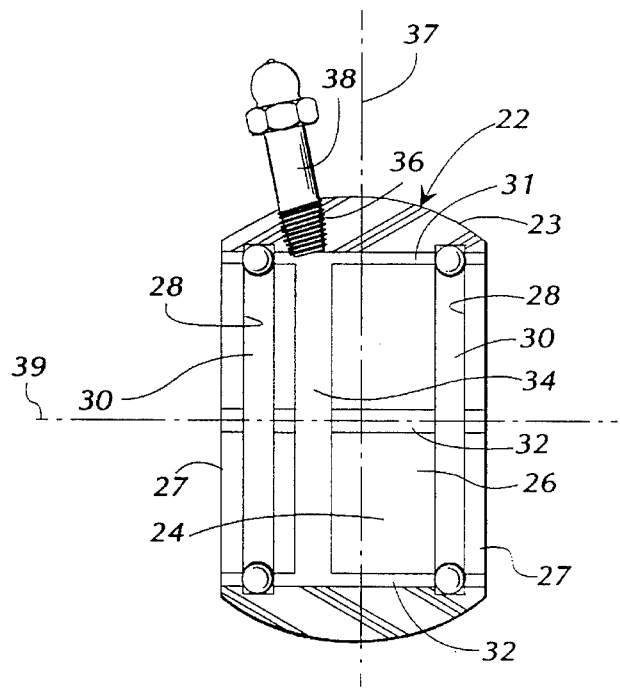
FIG. 3 is a sectional view of the camshaft bushing of the present invention.

As shown in FIG. 3, internal annular bushing 22 is a double truncated spherical ball having an outer spherical surface 23 and an inner cylindrical wall 24 defining a cylindrical central opening 26 (FIG. 1). The central opening 26 receives and rotatably supports the camshaft of the brake assembly (not shown). Two annular O-ring grooves 28 are defined within the inner surface 24 of the internal bushing, adjacent the outer edges 27 of the inner surface 24, which accept O-rings 30. Unlike most prior art camshaft bushings where the O-rings are located adjacent the opposite ends of the internal bushing and the inwardly protruding lip of the housing, in the present bushing the annular grooves 28 are formed in the cylindrical inner wall of the inner annular bushing. Thus, the length of the inner annular bushing can be increased to fill a larger portion of the receptacle of the housing, so that in the preferred embodiment of the invention, the axial length of the bushing, from edge 27 to opposite edge 27, is about 1.3 inches.

A grease port 36 extends through the inner annular bushing 22, from its spherical surface to its cylindrical surface, and receives a zerk fitting 38. The zerk fitting is a conventional ball and spring valve fitting which passes grease from a grease gun. Grease or other lubricant is delivered from outside the housing 10, through the zerk fitting 38 and its grease port 36 in the annular bushing 22, to the inner surface 24 of the annular bushing and to the facing surface of the camshaft. The grease port 36 and its zerk fitting 38 are mounted off center through the bushing at an approximately 12° angle from the plane 37 that extends at a right angle with respect to the longitudinal axis of the cylindrical wall of the bushing (FIG. 3). A shallow annular groove 34 on the inner surface 24 of the bushing intersects the grease port 36, and the grease delivered through the zerk fitting 38 is initially received in this hollow annular groove. In addition, a longitudinal groove 31 intersects grease port 36 and the grease passing through the zerk fitting is received directly in the longitudinal groove 31. Three other longitudinal, circumferentially spaced, grooves 32 are formed on the inner surface 24 of the bushing and intersect the annular groove 34, so as to temporarily store and help distribute the lubricant over the facing surfaces of the camshaft and the cylindrical surface of the inner annular bushing, and the O-rings 30 serve to keep the lubricant confined in the area defined between the O-rings.

Figure 4:
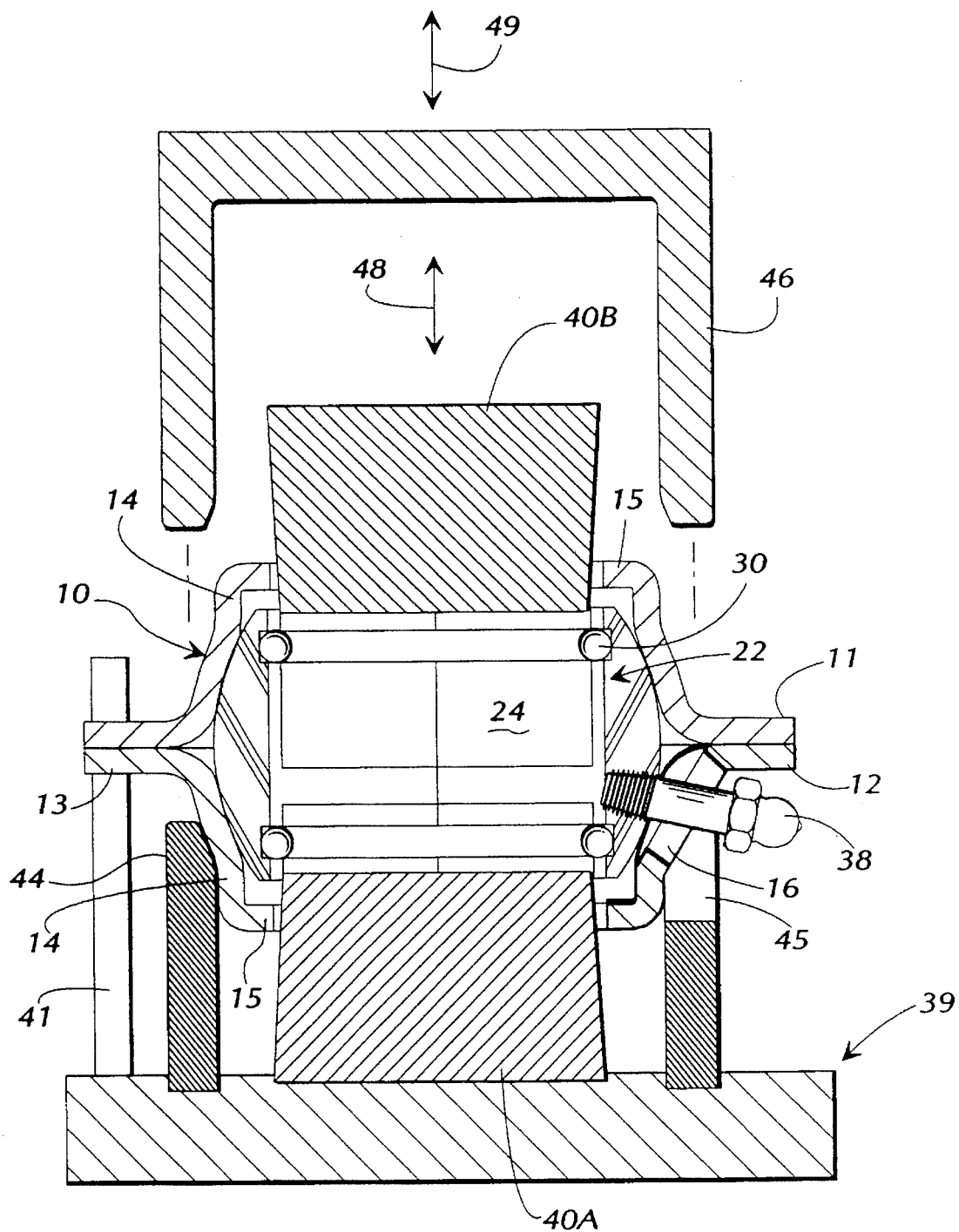
FIG. 4 is an illustrative view of the assembly procedure of the present invention.

When the elements of the bushing assembly are brought together for assembly, the zerk fitting 38 is threaded into or otherwise inserted into the grease port 36 of the inner annular bushing 22. Likewise, the O-rings 30 are placed in the O-ring grooves 28. As illustrated in FIG. 4, the metal plate 12 which includes the closed edge opening 16 is placed in the staking tool 39, with the bolt holes 18 fitted over upright pegs 41, so as to properly locate the plate in the staking tool. As the plate 12 slides down the pegs 41, the circular opening defined by the annular lip 15 surrounds the lower arbor 40A until the exterior surface of the annular protruding wall 14 engages the lower cylindrical swaging tool 44.

The inner annular bushing 22 is then set in the plate 12, with the zerk fitting 38 protruding through the closed edge opening 16 of the plate. A slot 45 is formed in the swaging tool 44 so as to accommodate the zerk fitting 38. When the inner annular bushing 22 is inserted in the plate 12, its cylindrical wall 22 registers with lower arbor 40A, so that the arbor 40A properly orients the downwardly facing portion of the inner annular bushing. Next, the opposing plate 11 is set in position, by sliding its bolt holes 18 over the upright pegs 41, into back-to-back relationship with respect to the other plate 12.

The upper swaging tool 46 and the upper arbor 40B are moved downwardly as indicated by arrows 48 and 49 so that the arbor 40B is urged inside the opening of the annular lip 15, thus aligning the upwardly facing portion of the inner annular bushing. In the meantime, the upper swaging tool 46 moves downwardly into engagement with the converging protruding wall 14. As the swaging tools 44 and 46 are brought together, they swage or deform the exterior annular surfaces of the protruding wall 14 of the opposed plates, causing the interior surfaces of the protruding walls to engage and frictionally hold the inner annular bushing 22 against rotation within the housing. The bushing is preferably not prevented from axially tilting so as to adjust to the position of a camshaft through the bushing. In the meantime, two or more punches (not shown) are brought into engagement with the perimeter walls of plate 11 to deform the abutting walls 11 and 12, thus connecting the walls together in a conventional manner.

It should be noted that arbors 40A and 40B protrude into the cylindrical inner wall area of the inner annular bushing, but do not protrude as far as the O-rings 30. Thus, the O-rings are not displaced or damaged by the assembly operation.

Further, the swaging operation of the outer surfaces of the annular protruding walls 14 of the plates 11 and 12 is accomplished without substantial distortion of the opening 16 of the protruding annular wall 14 of the housing plate 12, and the zerk fitting 38 is not forcefully engaged by any of the surfaces of the staking tool.

When the camshaft bushing assembly 9 is withdrawn from the staking tool, the distorted areas 50 will have been formed by the punch tool, showing the locations where the connection has been formed between the abutting perimeter walls of the housing.

When the bushing assembly is to be placed in use, a camshaft (not shown) is inserted through the bushing assembly, extending through the cylindrical central opening 26 (FIG. 1). Preferably, the camshaft extends through the bushing assembly and its opening 26 with the longitudinal axis of the camshaft lined up with the longitudinal axis of the bushing assembly. Sometimes, however, the camshaft will be tilted axially and may even contact the annular lips 15 of the housing. The size of the closed edge opening 16 is such that even when the camshaft is tilted to its furthest extent and contacts the annular lips 15, the zerk fitting 38 will not contact the edge of the housing defining the closed edge opening 16. Thus, the zerk fitting 38 is prevented from contacting the housing and sustaining damage.

The camshaft and bushing assembly is bolted in place on the vehicle with the use of bolts extending through bolt holes 18. Grease is communicated from a pressurized source through the zerk fitting, and the grease passes directly to the space between the cylindrical inner surface of the inner annular bushing and the facing surfaces of the camshaft, between the O-rings 30. The grease is allowed to spread substantially evenly about the camshaft by means of the annular groove 34 and the longitudinal grooves 31 and 32 formed in the inner cylindrical wall of the annular bushing 22.

While a preferred embodiment has been disclosed in detail in the foregoing description and drawings, it will be understood by those skilled in the art that variations and modifications thereof can be made without departing from the spirit and scope of the invention as set forth in the following claims.

What is claimed is:

1. A camshaft bushing, comprising:

a truncated spherical ball with an inner surface defining a central cylindrical opening therethrough;

said ball being comprised of molybdenum impregnated nylon;

said inner surface having two annular grooves near the outer edges of the inner surface for receiving two O-rings;

said ball having a grease port through the spherical wall for receiving a grease fitting for delivering lubricant to the central opening; and said inner surface having a shallow annular groove and a longitudinal groove both in alignment with said grease port for initially receiving lubricant from said grease fitting.

2. The bushing of claim 1, wherein said bushing is comprised of 98% polyhexamethylene adipamide and 2% molybdenum disulfide.

3. A camshaft bushing assembly, comprising:

a housing comprising two adjoined metal plates each with an outer support wall and an annular protruding wall converging inwardly and ending in a circular lip, wherein the protruding walls protrude away from each other and form an internal receptacle for a bushing and wherein one protruding wall has a closed-edge grease opening therein;

an inner annular bushing mounted in said receptacle, said bushing having an inner cylindrical wall defining a cylindrical central opening for rotatably supporting a camshaft extending therethrough;

said bushing comprised of molybdenum impregnated nylon;

a grease port extending through said bushing and communicating directly with said central opening of said bushing;

a grease fitting mounted in said grease port of said bushing and protruding outwardly through said closed edge opening for delivering lubricant from an external source directly to said central opening and the camshaft;

said bushing having two O-ring grooves on said inner surface for receiving O-rings, said O-ring grooves being integral pans of said bushing, and O-rings placed in said O-ring grooves for maintaining lubricant within the confines of the bushing.

4. The camshaft bushing assembly of claim 3, wherein said bushing is comprised of 98% polyhexamethylene adipamide and 2% molybdenum disulfide.

5. A camshaft bushing assembly for supporting a camshaft of a brake for a motor vehicle comprising:

an annular bushing for receiving and rotatably supporting a camshaft;

said bushing including an annular body having an outer surface, a substantially cylindrical elongated inner surface formed about a central axis and defining an opening sized and shaped to surround and rotatably support a camshaft;

a pair of parallel annular O-ring channels formed in said inner surface and displaced inwardly from opposite end portions of said cylindrical inner surface;

O-ring seals positioned in said O-ring channels for sealing contact between the inner surface of said annular bushing and the camshaft and forming a substantially sealed grease chamber between said camshaft and said bushing;

a plurality of intraconnecting grease grooves formed in said inner surface for facing the camshaft received in said annular bushing;

a grease inlet port extending through said annular bushing;

a grease fitting mounted in said grease port and extending away from said annular bushing;

a housing for mounting to a vehicle and supporting said annular bushing, said housing surrounding and in frictional contact with the outer surface of said bushing;

said housing including metal plates, each having a perimeter support wall for overlying abutment with the perimeter support wall of the other housing plate, and an annular protruding wall centrally positioned in each housing plate and extending away from the other housing plate and aligned with the annular protruding wall of the other housing plate and in engagement with said bushing, and said annular protruding walls together defining a central opening through said housing in alignment with the central opening of said annular bushing;

at least one of said annular protruding walls defining a closed-edge opening for receipt of said grease fitting;

said grease fitting extending from outside the housing, through the closed-edge opening of an annular protruding wall of the housing and into the grease port of the bushing;

whereby grease is urged from outside the housing through the grease fitting into the sealed space between the camshaft, the annular bushing and the O-ring seals at opposite ends of the annular bushing, and flows into the grease grooves of the bushing.

6. The camshaft bushing assembly of claim 5, wherein said closed-edge opening defined in said annular protruding wall is sized so that said grease fitting received through said closed-edge opening does not contact the annular protruding wall defining said closed-edge opening even when a camshaft supported through said bushing assembly is axially tilted to its maximum extent within said bushing assembly.

* * * * *